United States Patent
Tang et al.

(10) Patent No.: US 10,523,072 B2
(45) Date of Patent: Dec. 31, 2019

(54) ELECTRIC MACHINE ROTOR

(71) Applicant: Ford Global Technologies, LLC, Dearborn, MI (US)

(72) Inventors: Chun Tang, Canton, MI (US); Wei Wu, Northville, MI (US); Joel Hetrick, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 493 days.

(21) Appl. No.: 15/182,702

(22) Filed: Jun. 15, 2016

(65) Prior Publication Data

US 2017/0366056 A1    Dec. 21, 2017

(51) Int. Cl.
    H02K 1/27    (2006.01)

(52) U.S. Cl.
    CPC .................................. H02K 1/2766 (2013.01)

(58) Field of Classification Search
    CPC ...... H02K 1/2766; H02K 1/276; H02K 1/2773
    USPC ............. 310/156.38, 156.53, 156.57, 156.56
    See application file for complete search history.

(56) References Cited

U.S. PATENT DOCUMENTS

| | | | | |
|---|---|---|---|---|
| 5,852,338 A * | 12/1998 | Boyd, Jr. | ............... | H02K 1/165 310/89 |
| 6,777,847 B1 * | 8/2004 | Saban | .................... | H02K 1/265 310/179 |
| 8,350,431 B2 | 1/2013 | Liang et al. | | |
| 2009/0001841 A1 * | 1/2009 | Naganawa | ............... | H02K 3/12 310/207 |
| 2010/0026128 A1 * | 2/2010 | Ionel | ...................... | H02K 1/276 310/156.53 |
| 2011/0031843 A1 * | 2/2011 | Liang | ................... | H02K 1/2766 310/216.096 |
| 2012/0212095 A1 * | 8/2012 | Suzuki | ................. | H02K 1/2766 310/156.01 |
| 2013/0162068 A1 * | 6/2013 | Crosby | .................... | H02K 1/17 310/50 |
| 2013/0241339 A1 * | 9/2013 | Buskirk | ............... | H02K 1/2766 310/156.53 |
| 2014/0091664 A1 | 4/2014 | Aoyama | | |

(Continued)

FOREIGN PATENT DOCUMENTS

| | | | |
|---|---|---|---|
| EP | 435313 A | * 7/1991 | |
| WO | WO 2013131795 A2 | * 9/2013 | .......... H02K 1/2766 |

OTHER PUBLICATIONS

Dajaku (WO 201 31 31 795 A2) English Translation.*

*Primary Examiner* — Quyen P Leung
*Assistant Examiner* — Robert E Mates
(74) *Attorney, Agent, or Firm* — David Kelley; Brooks Kushman P.C.

(57) ABSTRACT

An electric machine may include a plurality of sections, each defining a permanent magnet pocket and a field formation chamber. The sections may be stacked to form a rotor such that when walls of the permanent magnet pockets are aligned from end to end, walls of the chambers of at least some of the sections are offset. An adjacent pair of the sections may have different chamber to pocket relative positions to define different pole arc angles. A difference between the first pole arc angle and the second pole arc angle may be equal to a slot pitch of a stator of the electric machine. The slot pitch may be 7.5 mechanical degrees. The chamber may be defined on a radially outward edge of the pocket. The chamber may taper in a radially outward direction.

20 Claims, 7 Drawing Sheets

(56) References Cited

U.S. PATENT DOCUMENTS

2014/0292133 A1 10/2014 Murota et al.
2015/0061447 A1 3/2015 Mae et al.
2015/0162790 A1* 6/2015 Isoda .................. H02K 1/2766
                                                          310/156.47

* cited by examiner

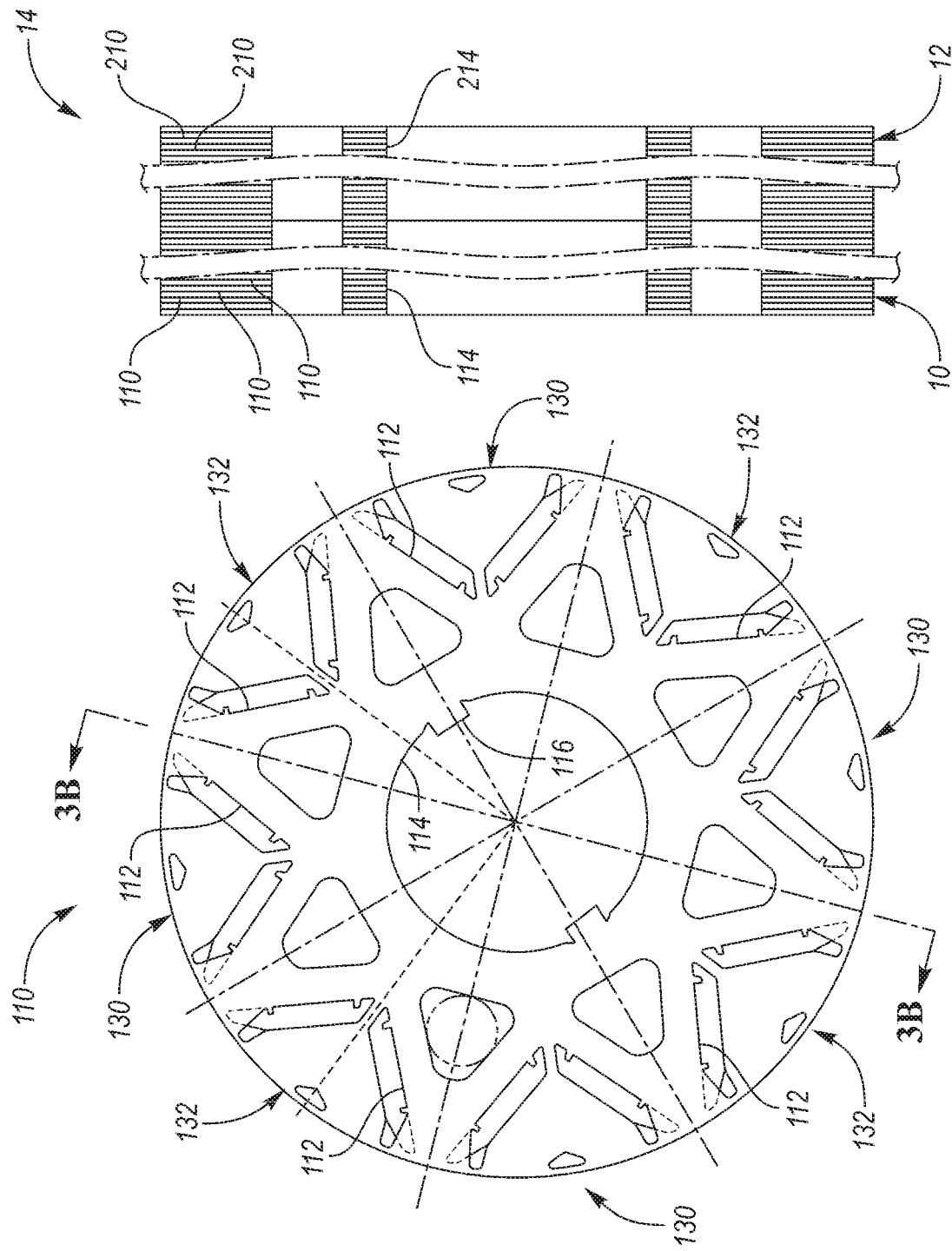

ELECTRIC MACHINE ROTOR

TECHNICAL FIELD

The present disclosure relates to a rotor for permanent magnet electric machine.

BACKGROUND

Electric machines typically employ a rotor and stator to produce torque. Electric current flows through the stator windings to produce a magnetic field. The magnetic field generated by the stator may cooperate with permanent magnets within the rotor to generate torque.

SUMMARY

An electric machine may include a plurality of sections, each defining a permanent magnet pocket and a field formation chamber. The sections may be stacked to form a rotor such that when walls of the permanent magnet pockets are aligned from end to end, walls of the chambers of at least some of the sections are offset. An adjacent pair of the sections may have different chamber to pocket relative positions to define different pole arc angles. A difference between the first pole arc angle and the second pole arc angle may be equal to a slot pitch of a stator of the electric machine. The slot pitch may be 7.5 mechanical degrees when the stator is a 48-slot stator. The chamber may be defined on a radially outward edge of the pocket. The chamber may taper in a radially outward direction.

An electric machine may include a plurality of sections each assembled from one or more laminations. The sections may be stacked to form a rotor. The sections may define pairs of v-shaped cavities having permanent magnet pockets and magnetic field guide chambers. At least one pair of adjacent sections may have superposed pockets and divergent chamber orientations defining a pole arc angle for each of the sections. A difference between the pole arc angles may be equal to a slot pitch of a stator of the electric machine. The slot pitch may be 7.5 mechanical degrees when the stator is a 48-slot stator. An angle between magnet pockets of the V-shaped cavities may be between a mechanical pole pitch of the rotor and 180°. The chamber may be defined on a radially outward edge of the pocket.

BRIEF DESCRIPTION OF THE DRAWINGS

FIG. 3A is a plan view of an overlay of the rotor laminations of FIGS. 1A and 2A;

FIG. 3B is a side view of the rotor section comprised of a stack of laminations shown in FIGS. 1A and 2A;

DETAILED DESCRIPTION

Figures 1A, 1B:
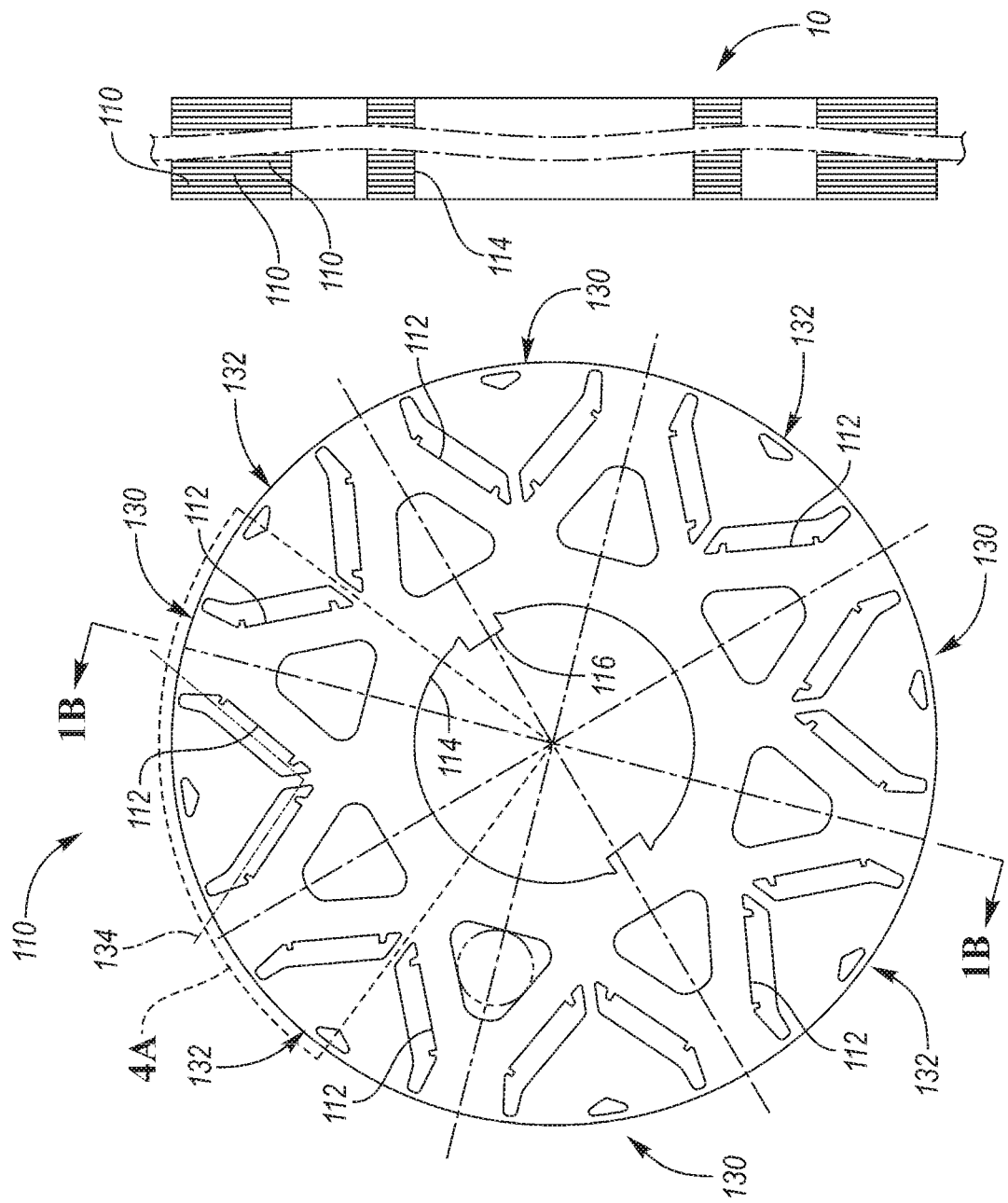
FIG. 1A is a plan view of a rotor lamination.
FIG. 1B is a side view of the rotor section comprised of a stack of laminations shown in FIG. 1A.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric machines are characterized by an undesirable oscillation in torque, which is caused by harmonics present in the airgap flux and in the airgap permeance. Most electric machines, and in particular Permanent Magnet (PM) electric machines, are designed with rotor skew (i.e., the poles of sections along the axis of the rotor are rotationally skewed relative to one another). Unfortunately, skewing may result in staggered permanent magnets and magnetic poles along the axis of the rotor. Skewed sections may cause an overall reduction in the average torque of the machine at all available speeds because the permanent magnets are out of alignment. Misalignment of the permanent magnets causes magnetic flux leakage. Thus, skewing helps to minimize torque harmonics, this results in an undesirable, yet previously essential, cost.

For example, an 8-pole machine with two rotor sections and 48-slot stator typically has a skew angle of 3.75°. Therefore, all of the features included in both sections of the rotor are rotationally offset by 3.75°. The skewing of the rotor is intended to produce a smoother mechanical torque through all frequencies than would otherwise be achieved using a rotor having aligned permanent magnets. Skewing may eliminate undesirable torque ripple caused by harmonics and many different skew angles may be used to achieve this result.

Permanent magnets of the rotor may be positioned or oriented in different ways to generate desirable magnetic fields. Each of the poles may be formed by a single permanent magnet oriented with one pole (i.e., north or south) in the radially outward direction. The poles of the rotor may be formed by groups of permanent magnets arranged to cooperatively form magnetic poles. One such arrangement orients the magnets in a V-shaped pattern. The internal portion of the "V" has similar magnetic poles that cooperate to form a magnetic pole of the rotor. An 8-pole rotor includes eight V-shaped patterns disposed about the rotor and spaced 45°.

Each of the permanent magnets may be disposed in pockets or cavities to retain the permanent magnets. These pockets or cavities are typically rectangular and sized to receive the permanent magnets. The cavities may be slightly oversized at opposite ends to limit magnetic flux leakage between north and south poles of the individual permanent magnets. Voids or cavities in the rotor core impede magnetic flux because a vacuum has a relatively low magnetic permeability compared to the rotor core material (e.g., electric steel).

The magnetic field in the airgap between the stator and rotor may be shaped or altered to produce an effect similar to mechanical skewing. Non-magnetically permeable cavities may be positioned about the permanent magnets to control the resulting magnetic flux into particular flow patterns into the airgap to magnetically skew the poles. This magnetic skewing can minimize torque harmonics without skewing the whole rotor section including the permanent magnets. Alignment of the permanent magnetics improves the overall torque output of the electric machine.

The magnetic skewing method of torque ripple reduction, as disclosed above, may accompany or replace mechanical skewing. Magnetic skewing alters the form or shape of the magnetic field emanating from the permanent magnets using field forming cavities or chambers. The field forming chambers may adjust the arc angle of the magnetic pole. Each of the magnetic poles of an eight pole rotor is designated in a 45° portion of the rotor lamination. This 45° portion is referred to as a mechanical pole pitch. Instead of allowing all of the magnetic poles to have an arc angle of 45°, the field forming chambers may be defined to guide the flux from each pole by reducing or widening the arc angle, while still keeping the magnet pockets and permanent magnets aligned from end to end. The resulting arc angle from each of the poles may still accumulate to cover the entire 360° outer peripheral surface of the rotor or cover less than the entire outer peripheral surface of the rotor.

Magnetic skewing may alter the field forming cavities or chambers that impede magnetic flux leakage between north and south poles of the same magnet. In order to create magnetic skewing, this chamber may be improved by extending the chamber or adding a second chamber in the radial direction to form the magnetic field. The arc angle of any one of the given poles may be adjusted relative to the arc angle of a complementary, axially offset pole located on an adjacent section of the rotor. For example, the arc angle of one of the poles on Section A may be adjusted to 40° and the adjacent pole on section B may be adjusted to 35°. Dissimilar arc angles reduce harmonic effects that generally burden electric machines.

The maximum torque of the electric machine may be reduced by modifying the relative arc angles. The difference between adjacent arc angles may be optimized to minimize cogging or torque ripple and ensure a high level of maximum torque is provided. The modification of arc angles may reduce lulls in torque output. These competing interests may be optimized to ensure electric machine function is improved.

Some of the magnetic poles may maintain a standard pole arc angle. In some embodiments the magnetic field arc angle of each of the poles may be altered relative to adjacent rotor sections. In other embodiments a group or subgroup of the poles may be altered relative to adjacent rotor sections. For example, adjacent north poles of the rotor may have different field arc angles to mitigate torque ripple, while adjacent south poles of the rotor may have the same pole arc angles. Any combination of relative arc angles may provide an acceptable reduction in torque ripple or cogging.

The size of the arc angle can have a direct impact on the machine output torque and the iron losses in stator and rotor laminations. A rotor having sections with equal thicknesses may dampen torque harmonics at the cost of iron losses. For this reason, the thickness of the altered arc angle section may be differed relative to a section having an arc angle optimized for torque output.

Referring now to FIG. 1A, a lamination 110 for a rotor is shown. The lamination 110 may define a plurality of cavities 112 adapted to hold permanent magnets in pockets. The center of the section 10 may define a circular central opening 114 with a keyway 116 for accommodating a driveshaft that may receive a drive key (not shown). The cavities may be oriented such that the permanent magnets (not shown) housed in the cavities 112 form eight alternating magnetic poles 130, 132. It is well known in the art that an electric machine may have various numbers of poles. The magnetic poles 130 may be configured to be north poles. The magnetic poles 132 may be configured to be south poles. The permanent magnets may also be arranged with different patterns. As shown in FIG. 1A, the cavities 112, which hold permanent magnets, are arranged with a V-shape 134. Referring now to FIG. 1B, a plurality of laminations 110 may form a Section A 10 of the rotor. The rotor has a circular central opening 114 for accommodating a driveshaft (not shown).

Figures 2A, 2B:
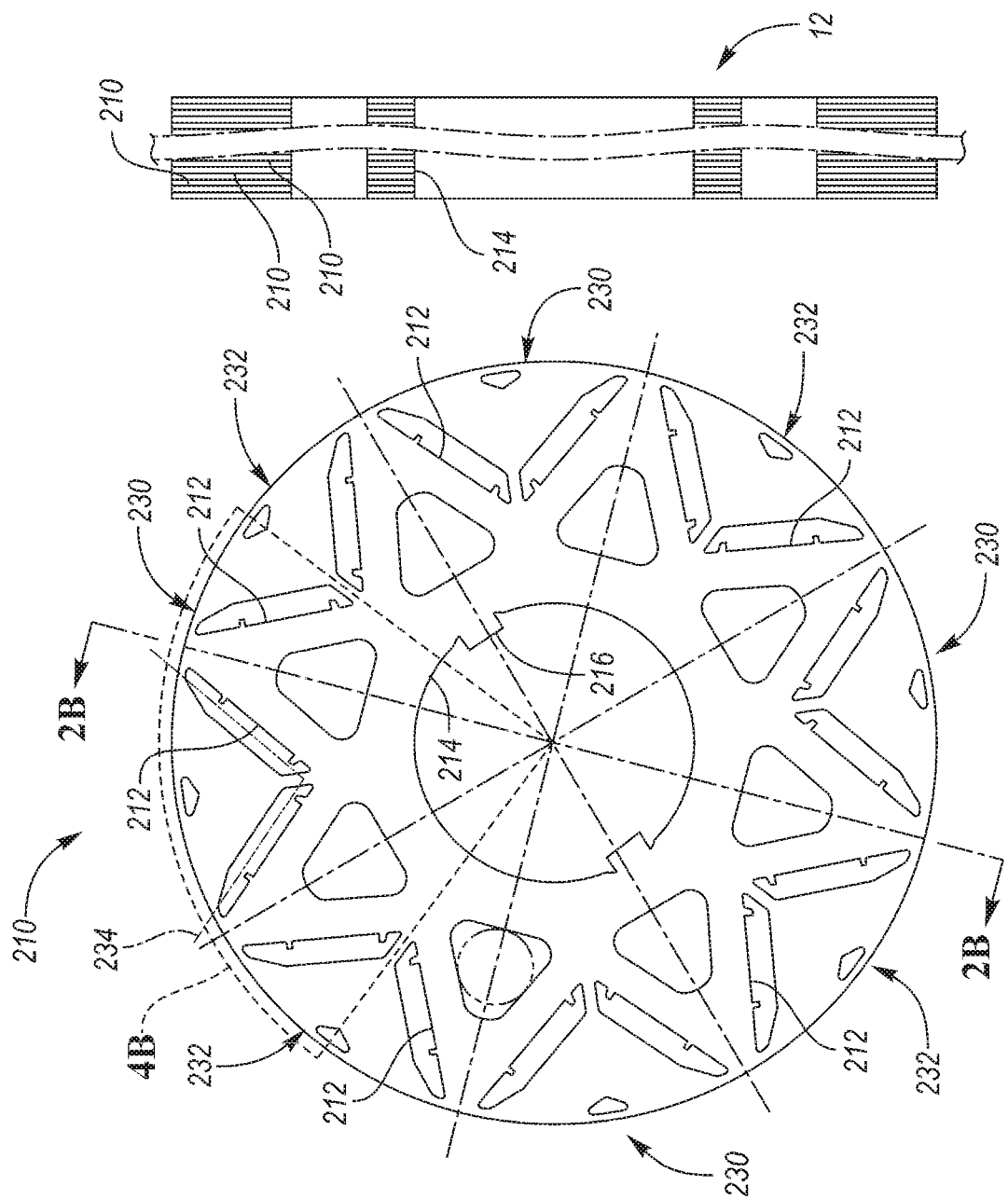
FIG. 2A is a plan view of a rotor lamination.
FIG. 2B is a side view of the rotor section comprised of a stack of laminations shown in FIG. 2A.

Referring now to FIG. 2A, a lamination 210 for a rotor is shown. The lamination 210 may define a plurality of cavities 212 adapted to hold permanent magnets. The center of the section 12 may define a circular central opening 214 with a keyway 216 for accommodating a driveshaft that may receive a drive key (not shown). The cavities may be oriented such that the permanent magnets (not shown) housed in the cavities 212 form eight alternating magnetic poles 230, 232. It is well known in the art that an electric machine may have various numbers of poles. The magnetic poles 230 may be configured to be north poles. The magnetic poles 232 may be configured to be south poles. The permanent magnets may also be arranged with different patterns. As shown in FIG. 2A, the cavities 212, which hold permanent magnets, are arranged with a V-shape 234. Referring now to FIG. 2B, a plurality of laminations 210 may form a Section B 12 of the rotor. The rotor has a circular central opening 214 for accommodating a driveshaft (not shown).

Referring now to FIG. 3A, the section 10 from FIG. 1 is shown superposed on the section 12 from FIG. 2. As shown, the position of the cavities 112 from section 10 and cavities 212 from section 12 are substantially aligned. The difference between these two sections is the pole arc angle created by the dissimilar chambers. As shown in FIG. 3B, the sections are stacked to form the rotor. The sections have the same orientation and drive shaft hole 114, 214. Unlike mechanically skewed rotors, the rotor 14 or rotor portion provides an unobstructed path through the cavities 112, 212 when looking down the axis of the rotor, except for the dissimilarly oriented chamber portions 106, 206, as shown in FIGS. 4A-B.

Figure 4A:
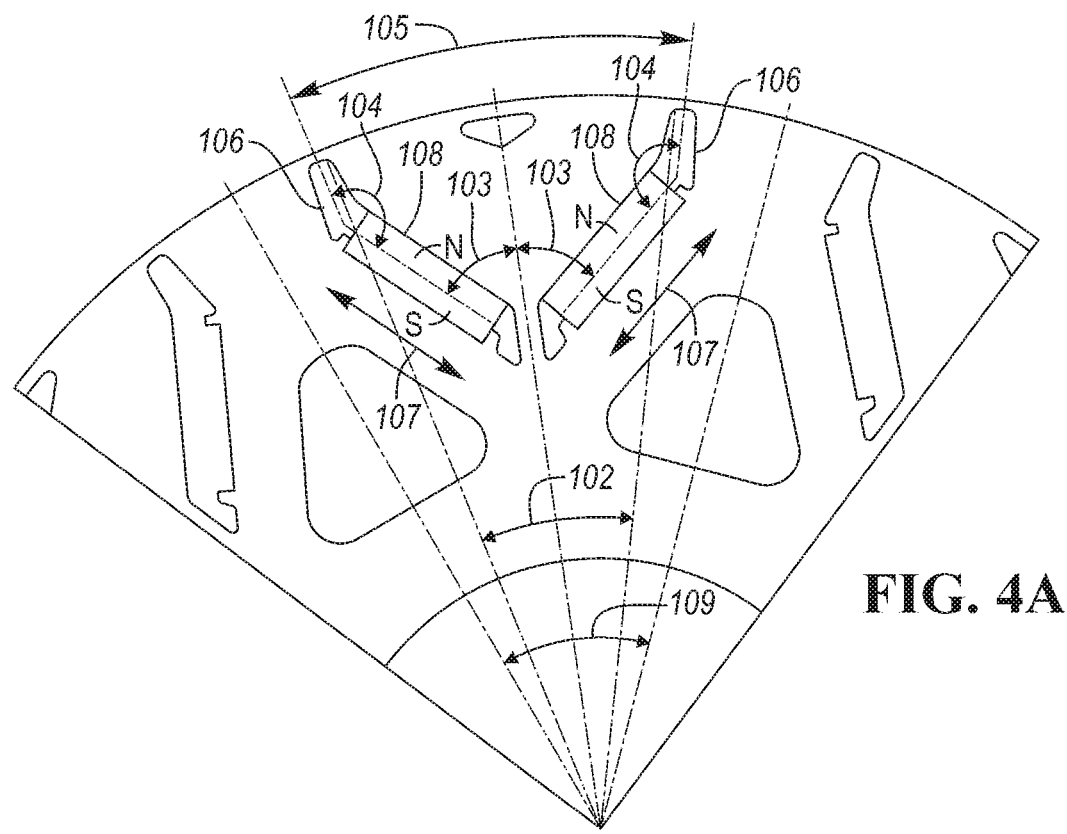
FIG. 4A is a diagrammatic view of an electric machine with a rotor comprised of multiple permanent magnets having a particular pole arc angle.
Figure 4B:
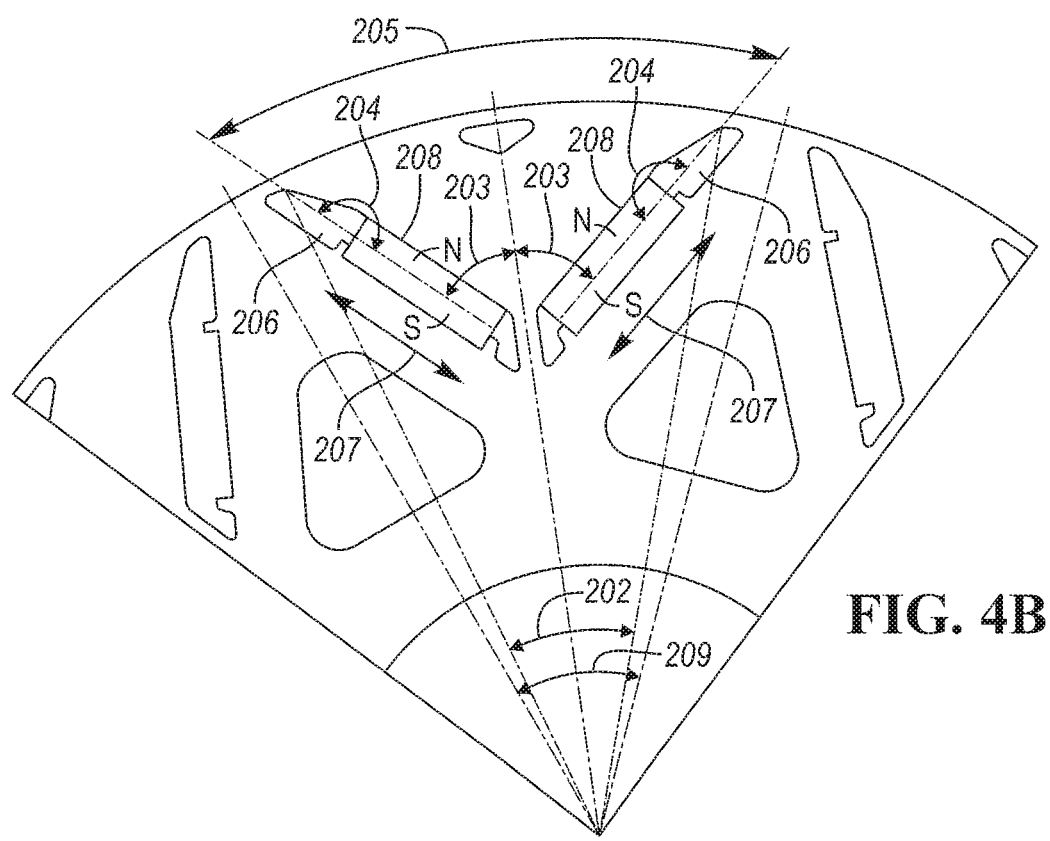
FIG. 4B is a diagrammatic view of an electric machine with a rotor comprised of multiple permanent magnets having a particular pole arc angle.

Referring now to FIG. 4A, the section 10 from FIG. 1B is shown having a particular pole arc angle 102. The pole arc angle 102 as shown is smaller than the pole arc angle 202 as discussed below. The pole arc angle is shaped by the angle of the chamber 106 relative to the magnet pocket 108. The section 10 may have a mechanical pole pitch 109 of 45°, as shown.

The pole arc angle 102 can be measured using a variety of methods. As shown, the pole arc angle 102 is measured as the angle between the most distinguished inner corner of the most radially outward portion of chamber 106 from the central axis of the rotor. The pole arc angle 102 can also be measured from the outermost edges of the chamber 106, the inner edges of the chamber 106, or a hypothetical center of gravity (e.g., if the chamber was filled with a material, the center of gravity of that material). The pole arc angle 102 can also be measured as an angle 104 between the V-shaped magnet pockets 108 and chambers 106.

The pole arc angle 102 may also be measured using the length of the arc 105 across the outer periphery of the rotor to define a surface. The surface may be defined by the length of the arc having a threshold magnitude of magnetic flux. For example, the shape of the features, chambers, may make it difficult to ascertain a generic definition and value for the pole arc angle. Under these circumstances, the magnetic flux crossing the arc length 105 or surface may be measured or estimated to determine the formed magnetic field. Measuring the result of the field-forming chamber may provide an improved indication of the desired pole arc angle instead of measuring the angle directly. This additional method may indirectly provide a comparison between the pole arc angles of the adjacent sections to determine whether magnetic skewing is used to reduce torque ripple.

The vertex for the angle may be determined as an intersection of an extension of the V-shaped permanent magnet pockets, an extension of the chambers, or a combination thereof. The vertex of the pole arc angle may also be the centroid of the section or lamination or the axis of rotation of the rotor.

In at least one other embodiment, the pole arc angles are defined by a magnet angle 103 and an orientation angle 104 relative to the magnet angle. The orientation angle 104 has a vertex defined at a point along an intersection of the pocket 108 and the chamber 106. One leg of the orientation angle is defined by a centerline passing through a centroid of the pocket 108. The centerline may be defined based on a center of mass or symmetry of the pocket. The other of the legs of the angle may be defined by a centerline passing through a centroid of the chamber 106. The centerline may be defined based on density or symmetry of the chamber. Any of the aforementioned methods or combinations thereof may be used to determine the pole arc angle of the Section A.

Referring now to FIG. 4B, the section 12 from FIG. 2B is shown having a particular pole arc angle 202. The pole arc angle 202 as shown is larger than the pole arc angle 102 as discussed above. The pole arc angle is shaped by the angle 204 of the chamber 206 relative to the magnet pocket 208. The section 12 may have a mechanical pole pitch 209 of 45°, as shown.

The pole arc angle 202 can be measured using a variety of methods. As shown, the pole arc angle 202 is measured as the angle between the most distinguished inner corner of the most radially outward portion of chamber 206 from the central axis of the rotor. The pole arc angle 202 can also be measured from the outermost edges of the chamber 206, the inner edges of the chamber 206, or a hypothetical center of gravity (e.g., if the chamber was filled with a material, the center of gravity of that material). The pole arc angle 202 can also be measured as an angle 204 between the V-shaped magnet pockets 208 and chambers 206.

The pole arc angle 202 may also be measured using the length of the arc 205 across the outer periphery of the rotor to define a surface. The surface may be defined by the length of the arc having a threshold magnitude of magnetic flux. For example, the shape of the features, chambers, may make it difficult to ascertain a generic definition and value for the pole arc angle. Under these circumstances, the magnetic flux crossing the arc length 205 or surface may be measured to determine the formed magnetic field. Measuring the result of the field-forming chamber may provide an improved indication of the desired pole arc angle instead of measuring the angle directly. This additional method may indirectly provide a comparison between the pole arc angles of the adjacent sections to determine whether magnetic skewing is used to reduce torque ripple.

The vertex for the angle may be determined as an intersection of an extension of the V-shaped permanent magnet pockets, an extension of the chambers, or a combination thereof. The vertex of the pole arc angle may also be the centroid of the section or lamination or the axis of rotation of the rotor.

In at least one other embodiment, the pole arc angles are defined by a magnet angle 203 and an orientation angle 204 relative to the magnet angle. The orientation angle 204 has a vertex defined at a point along an intersection of the pocket 208 and the chamber 206. One leg of the orientation angle is defined by a centerline passing through a centroid of the pocket 208. The centerline may be defined based on density or symmetry of the pocket. The other of the legs of the angle may be defined by a centerline passing through a centroid of the chamber 206. The centerline may be defined based on density or symmetry of the chamber. Any of the aforementioned methods or combinations thereof may be used to determine the pole arc angle of the Section B.

The orientation or bending angles 104, 204 may be determined by the relationship described in Equation 1.

$$\beta = 270° - \alpha - \tan^{-1} \frac{R_r \cos\left(\frac{\theta}{2}\right) - R_c - w_m \cos\alpha}{R_r \sin\left(\frac{\theta}{2}\right) - w_m \sin\alpha} \quad (1)$$

where the $\beta$, orientation angle 104, 204, is equal to a function of the magnet angle $\alpha$ 103, 203, the width of the permanent magnet pocket $w_m$ 107, 207, the pole arc angle $\theta$ 102, 202, the radial distance to the inner vertex of the V-shaped magnet pocket, $R_c$, and the rotor outer radius, $R_r$.

The orientation angle 104, 204, $\beta$, may be set between an angle relative to the magnet angle 103, 203, $\alpha$, as disclosed in Equation 2 below.

$$(180°-\alpha) \leq \beta \leq (270°-\alpha) \quad (2)$$

Other features (e.g., holes, cavities) generally included on rotor laminations to control magnetic fields may be included or not included to properly form magnetic fields in the air gap.

Figure 5A:
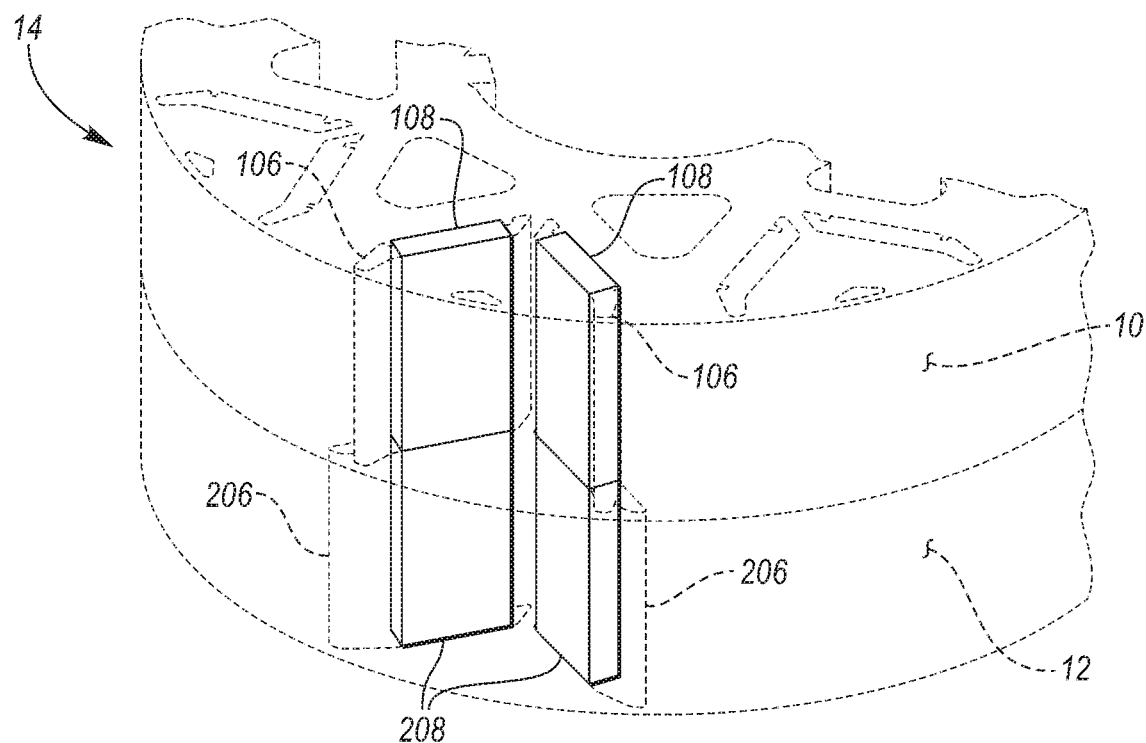
FIG. 5A is a perspective view of an electric machine rotor having dissimilarly situated magnetic field formation chambers.
Figure 5B:
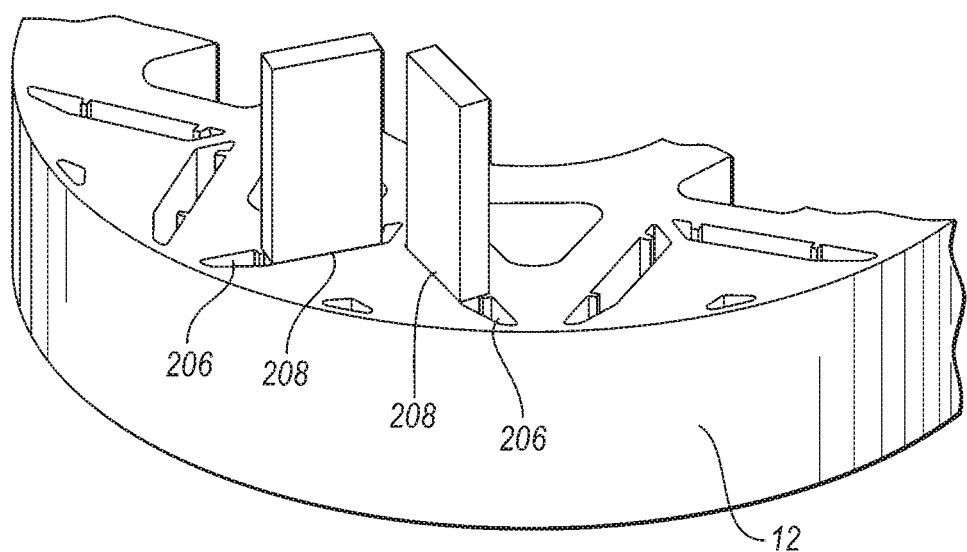
FIG. 5B is a perspective view of an electric machine rotor having dissimilarly situated magnetic field formation chambers and the upper section removed.

Now referring to FIG. 5A, two sections 10, 12 are stacked to form a portion of a rotor. The sections have aligned permanent magnet pockets 108, 208, which are retaining permanent magnets. The field forming chambers 106, 206 associated with each section form different pole arc angles to create magnetic skewing without skewing the magnets. FIG. 5B additionally shows the alignment of the magnets of both sections and the associated pockets 208 and chambers 206.

Figure 6:
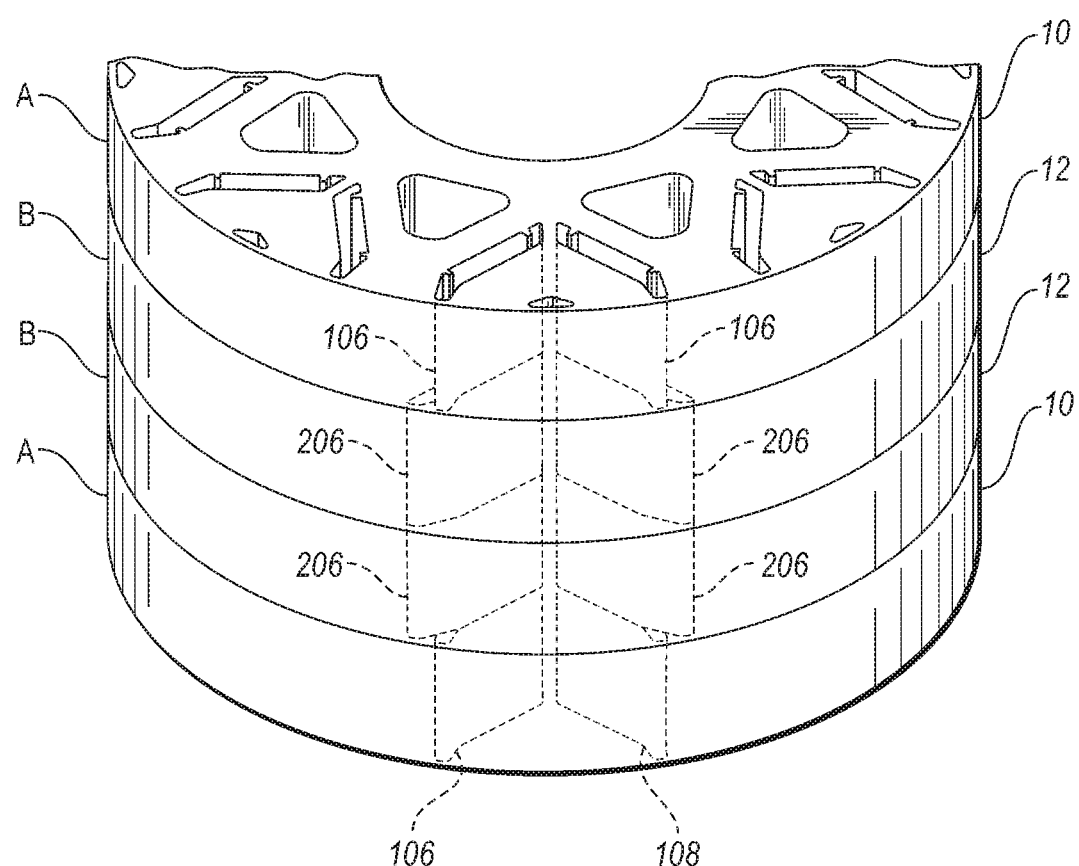
FIG. 6 is a perspective view of a rotor with an ABBA configuration.

Now referring to FIG. 6, a full ABBA rotor is depicted. The rotor includes multiple stacked sections 10, 12 to form a magnetically skewed rotor. Each section 10, 12 has a particular pole arc angle formed by the permanent magnets and chambers 106, 206. As shown, the permanent magnets are aligned such that minimal magnetic field leakage occurs between the sections. This configuration would also allow a single permanent magnet to traverse through each of sections, instead of multiple permanent magnets. An alternative BAAB rotor can be obtained by swapping the stacking sequence of section A and B (not shown). An alternative could also be ABAB or BABA.

Figure 7:
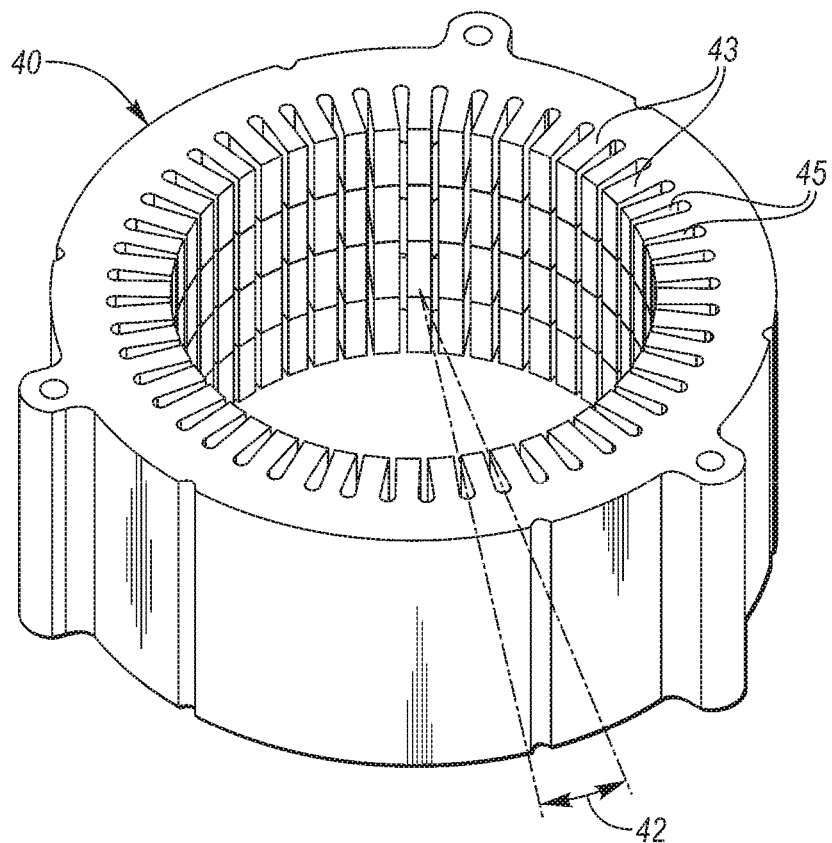
FIG. 7 is a perspective view of a stator.
Figure 8:
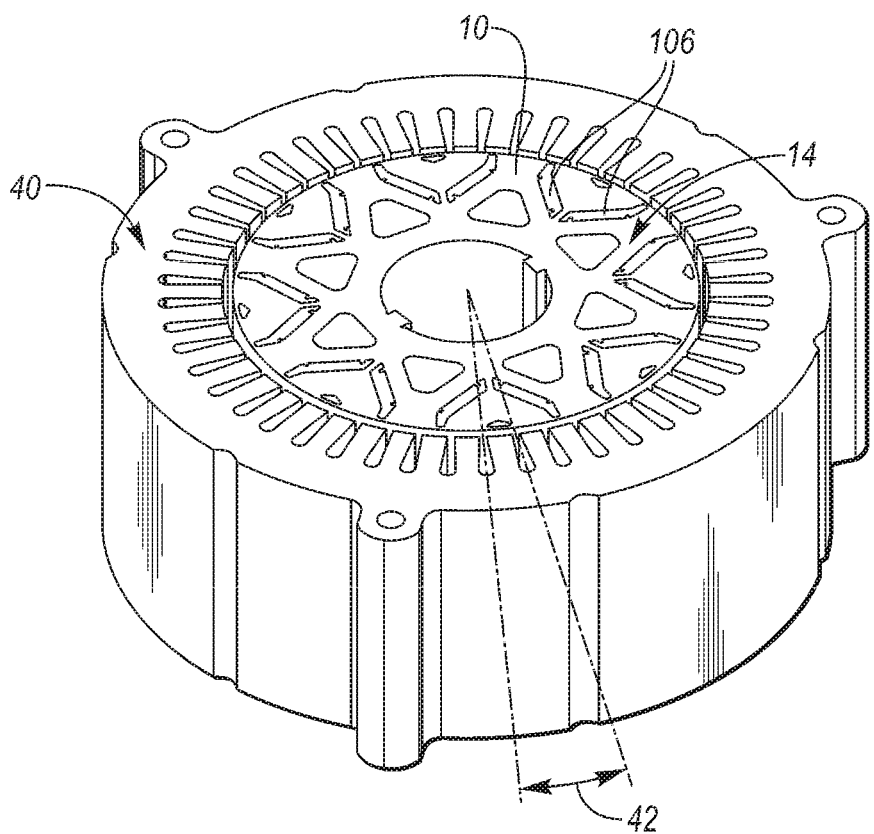
FIG. 8 is a perspective view of an electric machine having a stator and a rotor.

Now referring to FIGS. 7 and 8, a stator 40 is shown. The stator 40 has teeth 43 and stator winding cavities or slots 45 to support a set of stator windings. The stator 40 may surround a rotor 14 having a plurality of rotor sections 10, 12 (12 not shown) having permanent magnet pockets 108, 208 (208 not shown) arranged therein. Some of the sections are not shown. The difference between the pole arc angle may be equal to the slot pitch 42 of the stator. The slot pitch 42 is the mechanical angle between adjacent slots arranged around the entire stator 40. For example, a 48-slot stator 40 has a slot pitch 42 of 7.5 degrees. The difference between the pole arc angles may be equal to the slot pitch 42 of the stator 40.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric machine comprising:
    a plurality of sections, each defining a permanent magnet pocket and a field formation chamber, stacked to form a rotor such that when walls of the permanent magnet pockets are aligned from end to end, walls of the chambers of at least some of the sections are offset, wherein an adjacent pair of the sections has different chamber to pocket relative positions to define different pole arc angles.

2. The electric machine of claim 1, wherein a difference between a first pole arc angle and a second pole arc angle is equal to a slot pitch of a stator of the electric machine.

3. The electric machine of claim 2, wherein the slot pitch is 7.5 mechanical degrees.

4. The electric machine of claim 1, wherein the chamber is defined on a radially outward edge of the pocket.

5. The electric machine of claim 1, wherein the chamber tapers in a radially outward direction.

6. The electric machine of claim 1, wherein the pole arc angles are defined by an arc angle having a vertex at an axis of rotation of the rotor and radial legs intersecting an innermost edge of respective chambers.

7. The electric machine of claim 1, wherein the pole arc angles are defined by a magnet angle and an orientation angle relative to the magnet angle.

8. The electric machine of claim 7, wherein the orientation angle is between 270° minus the magnet angle and 180° minus the magnet angle.

9. The electric machine of claim 8, wherein the orientation angle has a vertex defined at an intersection of the pocket and the chamber, and wherein one of the legs of the angle is defined by a centerline passing through a pocket centroid, and an other of the legs of the angle is defined by a centerline passing through a chamber centroid.

10. An electric machine comprising:
    a plurality of sections, each assembled from one or more laminations, being stacked to form a rotor, and defining pairs of V-shaped cavities having permanent magnet pockets shaped to house permanent magnets and magnetic field guide chambers, wherein at least one pair of adjacent sections has superposed permanent magnet pockets and divergent magnetic field guide chamber orientations defining a pole arc angle for each of the pairs.

11. The electric machine of claim 10, wherein a difference between the pole arc angles is equal to a slot pitch of a stator of the electric machine.

12. The electric machine of claim 11, wherein the slot pitch is 7.5 mechanical degrees.

13. The electric machine of claim 10, wherein an angle between permanent magnet pockets of the V-shaped cavities is between a mechanical pole pitch of the machine and 180°.

14. The electric machine of claim 10, wherein the magnetic field guide chamber tapers in a radially outward direction.

15. The electric machine of claim 10, wherein the magnetic field guide chamber is defined on a side of the permanent magnet pocket housing a permanent magnet having an adjacent north and south pole abutted with the side of the permanent magnet pocket.

16. The electric machine of claim 15, wherein the magnetic field guide chamber is defined on a radially outward edge of the permanent magnet pocket.

17. The electric machine of claim 10, wherein the pole arc angles are defined by a magnet angle and an orientation angle relative to the magnet angle.

18. The electric machine of claim 17, wherein the orientation angle is between 270° minus the magnet angle and 180° minus the magnet angle.

19. The electric machine of claim 18, wherein the orientation angle has a vertex defined at an intersection of the permanent magnet pocket and the magnetic field guide chamber, and wherein one of the legs of the angle is defined by a centerline passing through a permanent magnet pocket centroid, and an other of the legs of the angle is defined by a centerline passing through a magnetic field guide chamber centroid.

20. An electric machine comprising:
    a plurality of sections, each defining pairs of V-shaped cavities having permanent magnet pockets and a field formation chamber, stacked to form a rotor such that when walls of the permanent magnet pockets are aligned from end to end, walls of chambers of at least some of the sections are offset, wherein an adjacent pair of the sections has different chamber to pocket relative positions to define different pole arc angles.

* * * * *